United States Patent [19]
Douglas et al.

[11] 3,814,514
[45] June 4, 1974

[54] MICROFORM PROJECTION AND VIEWER APPARATUS

[75] Inventors: James R. Douglas, Covina; Lloyd M. Adams, Santa Ana; Edward G. Mycek, Monrovia; David A. Grafton, Santa Monica, all of Calif.

[73] Assignee: Xerox Corporation, Stamford, Conn.

[22] Filed: Sept. 7, 1972

[21] Appl. No.: 286,648

[52] U.S. Cl. .................................. 353/78, 353/27
[51] Int. Cl. .................... G03b 21/28, G03b 21/30
[58] Field of Search ............................ 353/74–78, 353/27

[56] References Cited
UNITED STATES PATENTS

| | | | |
|---|---|---|---|
| 2,847,902 | 8/1958 | D'Incerti | 38/72 |
| 3,520,599 | 7/1970 | Martinez | 353/52 |
| 3,667,839 | 6/1972 | Artaud | 353/27 |
| 3,700,321 | 10/1972 | Peters | 353/78 |

FOREIGN PATENTS OR APPLICATIONS

| 996,137 | 12/1951 | France | 353/27 |
|---|---|---|---|

*Primary Examiner*—Louis R. Prince
*Assistant Examiner*—A. Jason Mirabito

[57] ABSTRACT

Apparatus for projecting and viewing microform images having a viewer housing including a viewing screen. A light source is supported therein for illuminating microform images on microform material. The light source is supported within a lamp housing and the lamp housing includes a plurality of fin members which extend externally outwardly therefrom to increase the heat transfer characteristics of the lamp housing. A light collecting reflector is supported within the lamp housing at one side thereof adjacent the light source and reflects radiation from the light source through an aperture in the lamp housing on the side opposite the collecting reflector along a first optical path. A condensing lens assembly along the first optical path illuminates microform images at a projection station and a projection lens assembly also along the first optical path projects the illuminated images onto a first reflecting member. The first reflecting member reflects the projected images along a second optical path onto a second reflective member which in turn reflects the projected images along a third optical path and onto the viewing screen. A carriage member is supported within the viewer housing and is adapted to receive a microform member. The carriage member provides a transportation arrangement for transporting the microform member in predetermined directions relative to the optical path and the projection station which directions are substantially mutually perpendicular. A guide arrangement is also provided for guiding a microform member from within the viewer housing for removal therefrom.

4 Claims, 3 Drawing Figures

MICROFORM PROJECTION AND VIEWER APPARATUS

BACKGROUND OF THE INVENTION

This invention relates generally to microform viewing and projection apparatus and more particularly to apparatus for viewing microfiche data.

In the past, numerous devices have been proposed to facilitate the viewing of microform transparencies. However, such devices heretofore have generally resulted in arrangements which are complex and expensive, large in size and heavy to transport, noisy and sometimes unreliable, and in many instances, inefficient and ineffective in operation.

With the ever-expanding usage of microform material such as microfiche for the storage of graphic information or other matter at compact, easily-retrieved sites, the necessity for the availability of apparatus for viewing such data has grown at a rate which perhaps exceeds the rate of growth in the use of microform as a storage medium by perhaps as much as an order of magnitude. Thus there has been demonstrated a continuing and increasing need for large numbers of microform viewing apparatus which are more convenient to operate, compact in size, light in weight, silent in operation and inexpensive so as to permit effective utilization of the microform medium. Unfortunately, however, heretofore most commercially available microform viewers have been unnecessarily complex, heavy, large in size, and perhaps more importantly, excessively expensive so as to preclude many potential users of microform medium for realizing the advantages which microform data inherently provides.

SUMMARY OF THE INVENTION

Accordingly, it is an object of the present invention to provide a microform viewer and projection apparatus which is small and compact.

It is another object of the present invention to provide a microform viewer and projection apparatus having a sturdy construction which is light in weight and therefore easily portable.

It is a further object of the present invention to provide a self-contained microform viewing apparatus which may be utilized alternatively for projecting microform images onto a front viewing screen.

It is still a further object of the present invention to provide a microform viewing apparatus which is quiet in operation.

It is still a further object of the present invention to provide a microform viewing apparatus which may be supported on the lap of the viewer to facilitate his convenience in the operation thereof.

It is yet a further object of the present invention to provide a microform viewer and projection apparatus having an improved arrangement for transporting and positioning microform images past the projection station.

It is yet a further and additional object of the present invention to provide a microform viewing and projection apparatus having a foldable optical path to facilitate ease in transportation and storage.

It is still a further and an additional object of the present invention to provide a microform viewing and projection apparatus which serves as an inexpensive means for viewing microform data in a wide variety of applications and locations and which produces high quality images in a highly effective and reliable manner.

These and other objects of the invention are attained by means of a housing member including a viewing screen having a light source therein for illuminating microform images on microform material. The light source is supported within a lamp housing located within the viewing housing and the lamp housing includes a plurality of fin members which extend externally outwardly therefrom to increase the heat transfer characteristics of the lamp housing. A light collecting reflector is supported within the lamp housing at one side thereof adjacent the light source and reflects radiation from the light source through an aperture in the lamp housing on the side opposite the collecting reflector along a first optical path. A condensing lens assembly along the first optical path illuminates microform images at a projection station and a projection lens assembly also along the first optical path projects the illuminated images onto a first reflecting member. The first reflecting member reflects the projected images along a second optical path onto a second reflective member which in turn reflects the projected images along a third optical path and onto the viewing screen. A carriage member is supported within the viewing housing and is adapted to receive a microform member. The carriage member provides a transportation arrangement for transporting the microform member in predetermined directions relative to the optical path and the projection station which directions are substantially mutually perpendicular. A guide arrangement is also provided for guiding a microform member from within the viewer housing for removal therefrom.

Other objects of the invention will become readily apparent to those skilled in the art in view of the following detailed disclosure and description thereof, especially when read in conjunction with the accompanying drawings.

DESCRIPTION OF THE PREFERRED EMBODIMENTS

Figure 1:
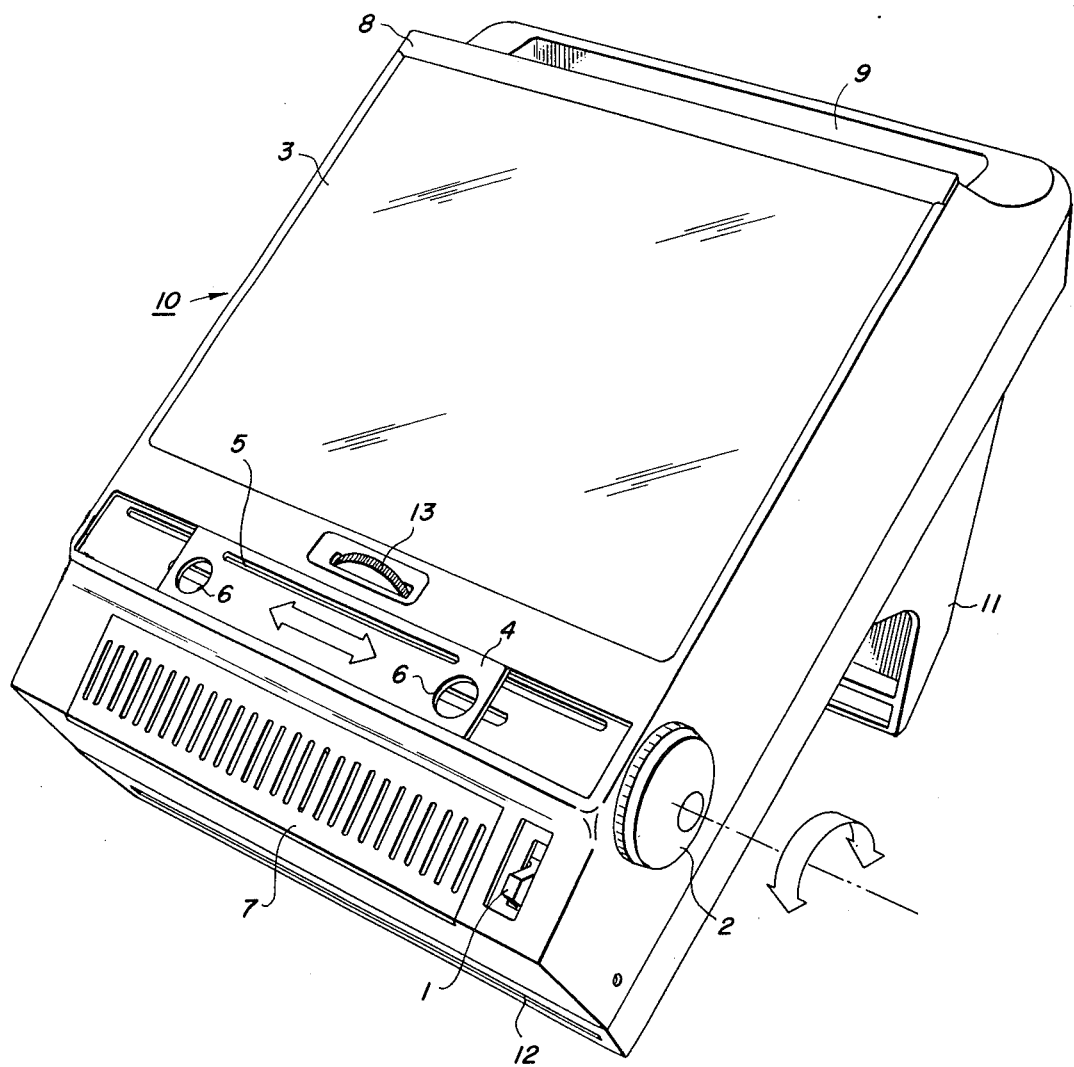
FIG. 1 is a perspective view of a microform viewer and projection apparatus as contemplated by the present invention.

Referring to FIG. 1 of the drawings, there is illustrated a microform projection and viewer apparatus as contemplated by the present invention. As illustrated therein, the microform projection and viewer apparatus as contemplated by the present invention includes a viewer housing which has been generally designated 10 as seen in FIG. 1. Housing 10 may be formed from any suitable material which is lightweight, attractive in appearance, and which is resistant to the adverse effects of light, temperature, abrasion, and which may be readily cleaned. Suitable materials include many plastic or polymeric materials which are moldable according to a predetermined design configuration. Housing 10 includes a handle portion 9 at the upper portion thereof as seen in FIG. 1, a foldable support member or stand 11, a focus adjusting control 13, an on-off switch 1, and a removable door 7 to provide access to internal portions of the operating mechanisms within the housing 10. Housing 10 also includes a microform positioning control 4 having a slot 5 therein to receive microform materials therein for projection at the projection station within housing 10. The microform positioning member 4 is operatively connected internally within housing 10 to a microform carriage also within housing 10 for lateral movement of the microform carriage and hence, the microform material relative to the projection station within the microform projection and viewing apparatus. This lateral movement of the microform carriage is effected by means of the microform positioning member 4 via apertures 6 located therein. As also seen in FIG. 1, housing 10 includes a microform carriage drive knob 2 for advancing the microform material into and out of the microform viewing and projection apparatus. Housing 10 further includes a microform exit slot 12 located at the lower portion of the housing 10 as seen in FIG. 1.

Housing 10 further includes a viewing screen 3 which is supported in the upper front portion of viewer housing 10. Viewing screen 3 is suitably supported within housing 10 by means of internally extending grooves along either side of housing 10 and extending across the housing above focus control 13. Viewer screen 3 may be constructed from any suitable material which is of a generally translucent nature upon which an image of light and dark patterns may be projected at one face thereof and which projected image may be readily viewable on the opposite face thereof. Suitable materials from which viewing screen 3 may be constructed include translucent glass as well as numerous translucent plastics which are generally commercially available. At the upper portion of screen 3 is attached a transversely extending raised member 8 by which screen member 3 may be inserted into or removed from the grooved portions of housing 10. As will hereinafter be more fully discussed, viewer screen 3 may be readily removed from housing 10 to permit illuminated images at the projection station to be projected onto a front form viewing screen. Thus it will be appreciated that the apparatus as contemplated by the present invention may be readily utilized as either a self contained viewer apparatus or alternatively as a projection apparatus.

Figure 2:
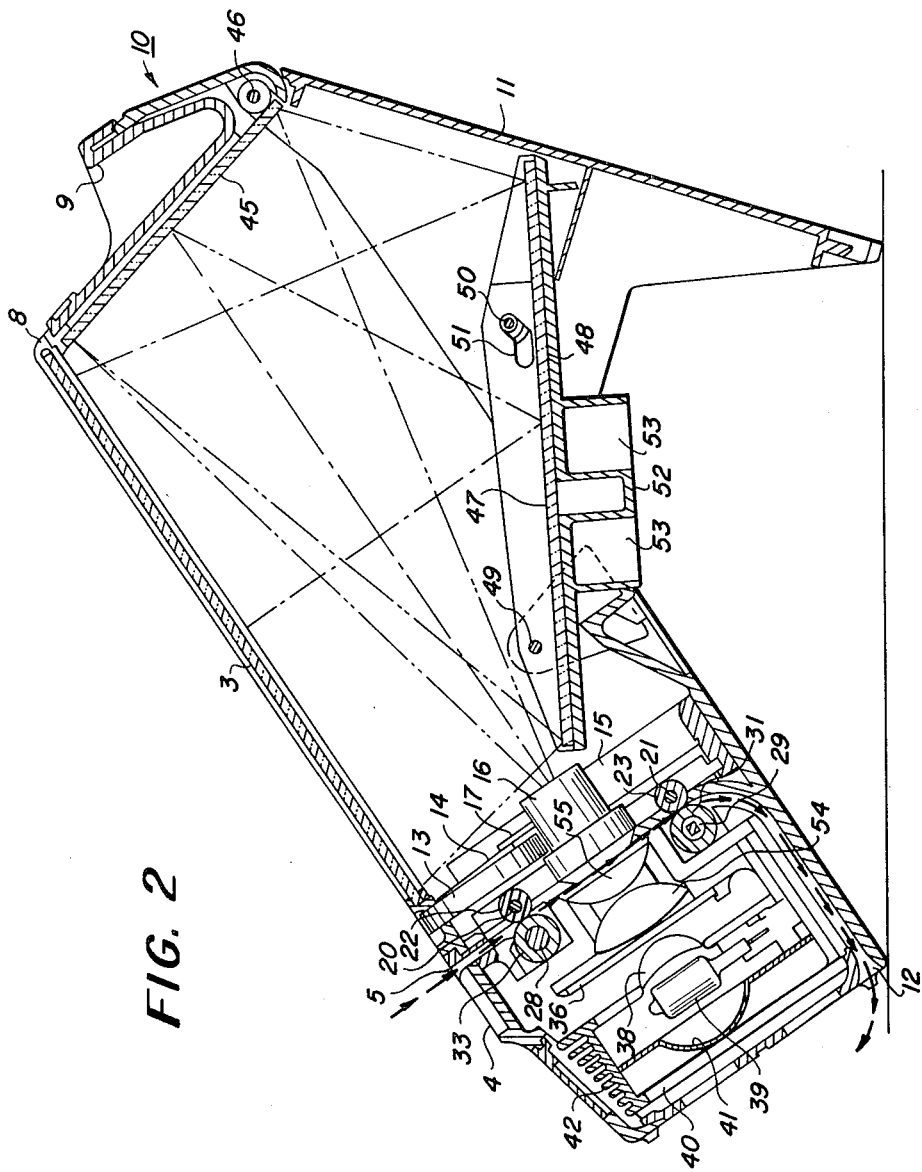
FIG. 2 is a cross sectional view of the microform viewer and projection apparatus of FIG. 1 showing the internal components and optical path.
Figure 3:
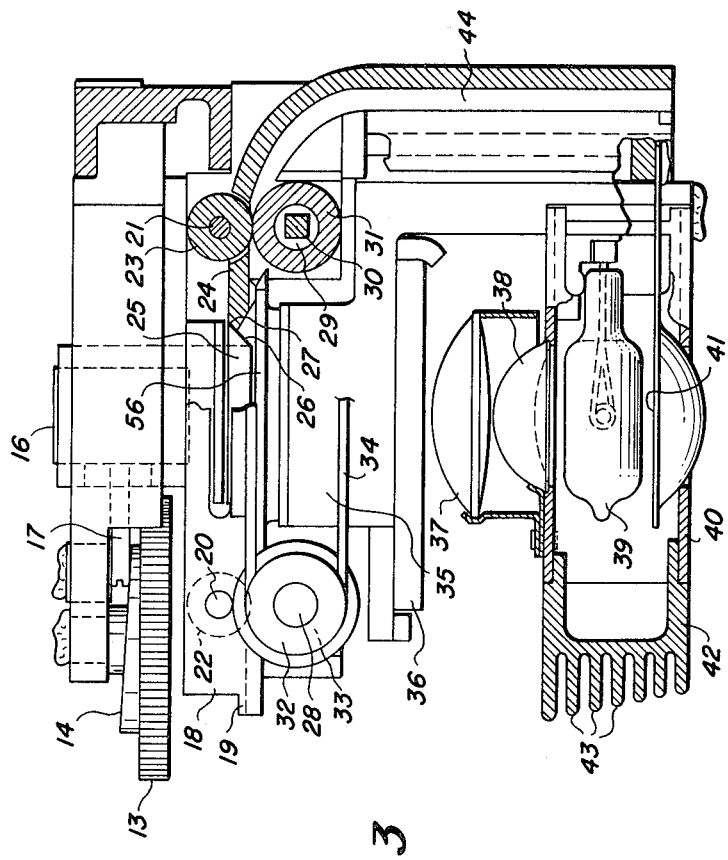
FIG. 3 is an enlarged cross sectional view of a portion of the microform viewer and projection apparatus of FIG. 2 which also shows an alternative lens configuration.

Reference to FIGS. 2 and 3 of the drawings will provide a more complete understanding of the microform viewer and projection apparatus as contemplated by the present invention. As seen in FIG. 2, support member 11 which comprises a portion of housing 10 is pivoted for movement relative to the main body of housing 10 by means of pins 46 located at either side of housing 10. A second pivotable member 48 which is likewise mounted for pivotal movement relative to housing 10 is supported at either side of housing 10 by means of pins 49. Support member 11 and pivotal member 48 are interconnected by means of a roller member 50 and slot 51 which are located at either side of the respective members. From this arrangement it will therefore be apparent that upon movement of support member 11 in a clockwise direction about pin 46 as seen in FIG. 2, pivotal member 48 will be rotated in a counterclockwise direction about pin 49 into housing 10 by means of roller member 50 acting on the internal surface of slot 51 within pivotal member 48. Thus as pivotal member 48 is pivoted internally within housing 10, support member 11 similarly will be pivoted into the closed position providing a compact storage position for support member 11.

As also seen in FIG. 2, a highly specular member such as mirror 45 is supported internally of housing 10 to receive image patterns projected from the projection station by means of projection lens assembly 16. A second highly specular reflective member such as mirror 47 is supported internally within housing 10 on pivotal member 48. Mirror 47 when in the extended position as shown in FIG. 2 is optically aligned to receive images projected onto mirror 45 and reflected therefrom and to reflect such images onto the rear side of viewing screen 3 when the microform viewing and projection apparatus is being utilized in that mode and alternatively onto a front form viewing screen when such apparatus is being utilized in the projector mode. It will also be appreciated that pivotal member 48 includes a projecting portion 52 having openings 53 at either side thereof which projecting member serves as a stop for support member 11 when support member 11 is in the closed position. In addition, projecting member 52 with the openings at 53 at either side thereof also provides suitable storage facility for accessories such as lamps, cords, etc.

As may be seen from FIGS. 2 and 3, a projection lamp 39 is supported internally within lamp support housing 40. A collecting reflector having a specularly reflective surface thereon is supported within lamp support housing 40 at the left of projection lamp 39 as seen in FIGS. 2 and 3 for projecting light energy emitted by projection lamp 39 along the optical path of the projection apparatus. Any suitable high intensity projection lamp may be utilized, such as a tungsten-halogen lamp. In addition to providing support for projection lamp 39, reflector 41 and lens element 38 of the condensing lens assembly, lamp housing 40 also provides a means of dissipating the infrared or heat producing energy generated by lamp 39. In addition to the base portion of lamp housing 40, the lamp housing assembly also includes a top portion 42 which is movable from the base portion to provide convenient access to the lamp area through removable door 7 in viewer housing 10. Lamp housing 40 includes numerous fins 43 such as seen in FIGS. 2 and 3 to increase the external surface area of lamp housing 40. Lamp housing 40 comprises any suitable material having a high thermal conductivity. Thus it will be appreciated that lamp housing 40 via the numerous external fins 43 thereon provides an effective means of transferring the heat generated by lamp 39 to the ambient surroundings within viewer housing 10. It will be further appreciated that the heat thus transferred will be discharged to the ambient surroundings external of the viewer housing 10 by means of natural convection through suitable vent openings in viewer housing 10. It will be further appreciated that this arrangement provides an effective arrangement for cooling the internal portion of the projection apparatus without resorting to the use of fans as are normally employed in conventional projection arrangements.

As previously mentioned, with the switch 1 positioned in the on position, power is provided to projection lamp 39 to energize the lamp and illumination from projection lamp 39 is reflected along the optical path of the projection apparatus by means of collecting reflector 41. Such illumination is further directed along the optical path to a projection station by means of a condensing lens arrangement. As will be appreciated by those skilled in the art, the number of individual lens elements employed within the system may vary for different applications depending upon the size of the particular film format which is to be projected at the projection station. In the embodiment illustrated in FIG. 2, the condensing lens assembly comprises a first lens element 38 supported adjacent lamp 39 following along in the optical path by a suitable filter member 36 which is sufficient to transmit those portions of radiant energy emitted by lamp source 39 which would not deleteriously affect the film material at the projection station while transmitting sufficient illumination to adequately illuminate the film image. Located subsequently along the optical path within lens barrel 36 are two additional lens elements 54 and 55 which in conjunction with lens element 38 comprise the condensing lens assembly of the embodiment of FIG. 2. As may be seen in the embodiment of FIG. 3, an additional lens element 37 is employed in addition to lens elements 38, 54, and 55 which optically conforms to the requirements of the particular film format contemplated for use with the embodiment of FIG. 3. As will also be appreciated, additional lens arrangements may be employed in order to accommodate additional variations in film formats.

As previously stated, an image at the projection station is illuminated by means of light source 39, reflector 49 and the condensing lens assembly. From the projection station, an illuminated image is projected along the optical path onto mirrors 45, 47, and viewing screen 3, or alternatively in the projection mode onto a front viewing screen by means of projection lens assembly 16. Projection lens assembly 16 is supported within the optical path by means of support member 15 which is attached to internal portions of viewer housing 10. Focus control knob 13 having a portion thereof which extends through viewer housing 10, is supported for rotation on support member 15 and includes a cam surface 14 thereon. A cam follower member 17 attached to projection lens assembly 16 is engageable with the cam surface 14 on focus control knob 13. Thus it will be apparent that upon rotation of focus control 13, cam follower 17 will be displaced along the optical path in accordance with cam surface 14. Such movement of cam follower 17 thereby effects the spacing between the lens elements of projection lens assembly 16 to provide effective focusing of the projected images on viewing screen 3.

Microform material having images thereon such as microfiche, are supported and transported past the projection station by means of a microform carriage arrangement. The microform carriage as contemplated by the present invention includes a main support member 18 to which positioning member 4 is attached via projection 19. A first shaft 20 is supported on microform carriage member 18 on the input side of the projection station and has supported thereon a plurality of successively spaced rotatable roller members 22. On the exit side of the projection station is also supported a second shaft 21 also having a plurality of successively spaced rotatable roller members mounted thereon. It will be noted that roller members 22 and 23 are situated within suitable openings in the main support member 18 of the film carriage to project into the film path and engagement with roller members 33 and 31, respectively. Roller members 33 and 31 are supported for rotation on main support member 18 by means of shafts 28 and 29, respectively. Roller members 33 and 31 are interconnected in a driving arrangement to rotate in synchronism by means of a pair of pulley members 32 attached to shafts 28 and 29 and timing belt 34 which is entrained about pulley members 32. A polygonally shaped shaft member 30 is supported internally within shaft 29 within a suitably configured aperture to permit relative movement between shafts 29 and 30. Shaft 30 is supported within suitable bearing arrangements within viewer housing 10 and extends through either side thereof to which is attached a pair of microform carriage drive knobs 2 for advancing the microform material into and out of the microform viewing and projection apparatus. As may be seen from FIG. 3, a film guide member 25 having a generally trapazoidal cross sectional configuration is supported on the projection lens assembly 16 at the projection station to provide one side of a film guide at the projection station. Guide member 25 extends laterally within the microform viewing apparatus and is suitably supported at either end thereof within housing 10. Guide member 25 at the projection station also includes a suitably arranged transparent portion to permit the illuminated images on microform material to be projected along the optical path by means of projection lens assembly 16. Guide member 25 also includes a pair of tapered surfaces 26 along either edge thereof which cooperate with tapered surfaces 27 along a laterally extended opening within the main support 18 of the microform carriage. A second guide member 56 is supported on condensing lens assembly barrel 35 at the projection station adjacent guide member 25. Guide member 56 comprises a material which is optically transparent so as to permit complete illumination of the film material at the projection station and cooperates with guide member 25 to provide a film path at the projection station which permits both lateral and longitudinal movement of the film material past the projection station.

A suitably arranged opening extending through projecting portion 19 of the main support 18 of the film carriage is aligned with the opening 5 of microform positioning member 4 to permit insertion of a microform member such as a microfiche through opening 5 in microform positioning member 4 into the nip formed between roller members 33 and 22. In this position, microform carriage drive knob 2 may be rotated in the clockwise direction as viewed from the right in FIG. 1. As knob 2 is thus rotated, roller member 31 will be rotated about shaft 30 as seen in FIG. 3 in a clockwise direction. This movement produces a rotation of roller members 23 about shaft 21 in a counterclockwise direction as also seen in FIG. 3. As a result of the interconnection between roller members 31 and 33 via belt member 34 and pulley members 32, roller member 33 will similarly be driven in a clockwise direction as seen in FIG. 3. Such rotation of roller member 33 produces a rotation of roller members 22 in a counterclockwise direction about shaft 20 as seen in FIG. 3, thus advancing the microform material between the nip of roller member 33 and roller members 22. Upon continued rotation of carriage drive knob 2, the microform material will be advanced into the passageway at the projection station which is formed between guide members 56 and 25 and into the nip between roller member 31 and roller members 23. Thus it will be apparent that a microform member may be longitudinally positioned in relation to the projection station to locate a predetermined longitudinally oriented position on the microform member at the projection station by rotating carriage drive knob 2 in a selected direction of rotation. It will also be appreciated that through the aid of microform positioning member 4 the microform carriage arrangement may be laterally positioned within viewer housing 10 relative to the optical path and guide members 25 and 56 as roller member 31 is permitted to be positioned along shaft 30. This arrangement therefore permits a lateral positioning of the microform material relative to the optical path to locate a predetermined lateral positinn on the microform material at the projection station by lateral movement of microform positioning member 4. Continued rotation of carriage drive knob 2 in the clockwise direction will advance the microform material past the projection station and the nip formed between roller members 31 and 23 and into the passageway 44. Passageway 44 which is formed by an integral portion of main support 18 cooperates with the microform exit slot 12 to guide the leading edge through slot 12 for removal of the microform material from the machine by the operator.

From the foregoing description it will therefore be appreciated that the apparatus as contemplated by the present invention provides an effective arrangement for viewing microform images in a compact and simplified manner or alternatively may provide an arrangement for projecting microform images onto a front viewing screen. It will also be appreciated that the instant arrangement provides a means by which the objectives as herein set out are accomplished in a novel, compact, efficient, and reliable manner.

While the invention has been described with reference to preferred embodiments, it will generally be understood by those skilled in the art that various changes may be made and equivalents may be substituted for elements thereof without departing from the true spirit and scope of the invention.

What is claimed is:

1. A microform viewing and projection apparatus comprising in combination:
    a housing including a first section having a first slot and a viewing screen and
    a second, solid section,
    coupling means for providing pivotal rotation of said second section relative to said first section such that said second section can assume either an operative position or an inoperative position,
    a light source within said housing for illuminating microform images on microform material,
    means within said housing for focusing illumination from said light source onto said microform images,
    projection means for projecting illuminated images of said microform along a first optical path within said housing,
    a first reflective member interposed along said first optical path to reflect projected images along a second optical path, said first reflecting member having an end portion adjacent said coupling means, and
    a second reflective member interposed along said second optical path, said second reflective member being separate from said second housing section and pivotable from an operable position, that reflects projected images from said second optical path along a third optical path and onto said viewing screen, to an inoperable position, that does not reflect images along said third optical path,
    the support for said second reflective member and said second housing section providing a storage area when said second section and said second reflective member are in the operative position.

2. The apparatus of claim 1 wherein said second reflective surface is pivoted about a point remote from the point about which said second section is pivoted.

3. The apparatus of claim 1 further including:
    a movable microform carriage member within said housing, means supporting said carriage member for movement thereof in a first direction relative to said first optical path,
    said carriage member including a projection portion which extends through said first slot and has a second slot therein for receiving microform, said projection portion providing for movement of said carriage member in a first direction and accordingly for movement in said first direction of microform inserted through said third slot,
    a first pair of rollers mounted on said carriage member, said first pair of rollers providing a first nip proximate to and substantially aligned with said second slot,
    a second pair of rollers mounted on said carriage member, said second pair of rollers providing a second nip substantially aligned with both said first nip and said second slot, said first and second pair of rollers being operatively coupled to a shaft extending through said housing such that rotation of said shaft produces rotation of all of said rollers and accordingly produces movement in a second direction of microform inserted through said third slot, said first and said second directions being substantially mutually perpendicular.

4. The apparatus of claim 1 further including a focus control assembly having a support member coupled to said projection means, said support member having a cam surface, a cam follower operably engaging said cam surface such that axial movement of said cam follower produces displacement of said focus control assembly.

* * * * *